(12) United States Patent
Dees et al.

(10) Patent No.: US 12,225,085 B2
(45) Date of Patent: *Feb. 11, 2025

(54) LOW POWER IPV6 SYSTEM AND DEVICE

(71) Applicant: KONINKLIJKE PHILIPS N.V., Eindhoven (NL)

(72) Inventors: Walter Dees, Eindhoven (NL); Franciscus Antonius Maria Van De Laar, Veldhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 18/218,635

(22) Filed: Jul. 6, 2023

(65) Prior Publication Data

US 2023/0362254 A1 Nov. 9, 2023

Related U.S. Application Data

(63) Continuation of application No. 16/965,388, filed as application No. PCT/EP2019/051673 on Jan. 24, 2019, now Pat. No. 11,716,387.

(Continued)

(51) Int. Cl.
*G06F 15/16* (2006.01)
*H04L 67/125* (2022.01)
(Continued)

(52) U.S. Cl.
CPC ............ *H04L 67/125* (2013.01); *H04L 69/16* (2013.01); *H04L 69/22* (2013.01); *H04L 69/324* (2013.01);
(Continued)

(58) Field of Classification Search
CPC ....... H04L 67/125; H04L 69/16; H04L 69/22; H04L 69/324
See application file for complete search history.

(56) References Cited

U.S. PATENT DOCUMENTS

| 7,391,736 B2 | 6/2008 | Na |
| 7,986,628 B2 | 7/2011 | Fujinami |

(Continued)

FOREIGN PATENT DOCUMENTS

| JP | 2006086605 A | 3/2006 |
| KR | 20150145174 A | 12/2015 |
| WO | 0211397 A1 | 2/2002 |

OTHER PUBLICATIONS

International Search Report and Written Opinion from PCT/EP2019/051673 mailed Jun. 14, 2019.

*Primary Examiner* — Duyen M Doan

(57) ABSTRACT

A wireless device (S) includes a radio (R) for communicating via a wireless communication protocol which employs messages constructed as layer 2 MAC frames each including a layer 2 MAC header and a payload. The wireless device is configured to operate in (i) a first mode in which the wireless device transmits messages (N0, ..., Nn) via the radio each including an IPv6 packet header and an upper layer protocol data unit encapsulated within the payload of a layer 2 MAC frame, and (ii) a second mode in which the wireless device transmits messages (M0, ..., Mn) via the radio each including an upper layer protocol data unit encapsulated within the payload of a layer 2 MAC frame without including the IPv6 header. A relay device (T) comprises a radio for communicating via the wireless communication protocol which employs messages constructed as layer 2 MAC frames each including a layer 2 MAC header and a payload. In one power-saving aspect, the relay device is configured to perform a header insertion service (I) in which the relay device receives messages (M0, ..., Mn) via its radio from the wireless device (S), each including an upper layer protocol data unit encapsulated within the payload of a layer 2 MAC frame without including the IPv6 header. The header insertion service inserts header information (A') into the (Continued)

messages (M0, ..., Mn) received from the wireless device (S) and retransmits the messages with complete headers as messages (M0', ..., Mn'). In another power-saving aspect, the relay device additionally or alternatively applies an acknowledgement detection criterion to filter out acknowledgements received from the server, and forwards the filtered out acknowledgements to the wireless device (S) via the radio at a reduced rate.

33 Claims, 8 Drawing Sheets

Related U.S. Application Data

(60) Provisional application No. 62/622,982, filed on Jan. 29, 2018.

(51) Int. Cl.
```
H04L 69/16      (2022.01)
H04L 69/22      (2022.01)
H04L 69/324     (2022.01)
H04L 101/604    (2022.01)
H04L 101/622    (2022.01)
H04L 101/659    (2022.01)
```
(52) U.S. Cl.
CPC .. *H04L 2101/604* (2022.05); *H04L 2101/622* (2022.05); *H04L 2101/659* (2022.05)

(56) References Cited

U.S. PATENT DOCUMENTS

| | | | |
|---|---|---|---|
| 8,369,348 B2 | 3/2013 | Pullen | |
| 8,831,002 B2 | 9/2014 | Haserodt | |
| 10,021,688 B2 | 7/2018 | Xie | |
| 10,044,473 B2* | 8/2018 | Tzannes | H04L 1/0045 |
| 10,531,365 B2 | 1/2020 | Kaur et al. | |
| 2004/0141524 A1 | 7/2004 | Lee et al. | |
| 2004/0264433 A1 | 12/2004 | Melpipnano | |
| 2006/0117084 A1* | 6/2006 | Morozumi | H04N 1/32133 |
| | | | 709/203 |
| 2009/0161581 A1 | 6/2009 | Kim | |
| 2009/0161680 A1* | 6/2009 | Ishikawa | H04L 69/161 |
| | | | 370/400 |
| 2009/0185549 A1 | 7/2009 | Shon et al. | |
| 2010/0071018 A1* | 3/2010 | Kabuto | H04L 61/5038 |
| | | | 725/127 |
| 2010/0189103 A1 | 7/2010 | Bachmann et al. | |
| 2013/0138830 A1 | 5/2013 | Fang | |
| 2013/0235862 A1 | 9/2013 | Kahng et al. | |
| 2014/0003432 A1* | 1/2014 | Haserodt | H04L 65/80 |
| | | | 370/392 |
| 2016/0337786 A1 | 11/2016 | Kafle et al. | |
| 2018/0176118 A1* | 6/2018 | Adler | H04L 12/462 |

* cited by examiner

LOW POWER IPV6 SYSTEM AND DEVICE

This application is a continuation of U.S. application Ser. No. 16/965,388 filed Jul. 28, 2020 which is the U.S. national stage of PCT/EP2019/051673 filed Jan. 24, 2019 which claims the benefit of U.S. Provisional Application No. 62/622,982 filed Jan. 29, 2018 which is incorporated herein by reference in its entirety.

FIELD

The following relates generally to wireless medical sensors, low power wireless sensors, mobile sensors, and to other similar applications.

BACKGROUND

The Bluetooth Low Energy (BLE) communication protocol is a subset of the Bluetooth standard aimed at low power applications. The latest Bluetooth-5 standard with optional range and data length extensions for BLE make it a more suitable candidate for Internet of Things (IoT) and Internet of Health (IoH) devices in application areas such as home automation and healthcare. Also an Internet Protocol Support Profile (IPSP) specification has been released in conjunction with an IETF specification RFC7668 to enable support of exchanging IPv6 packets between devices over Bluetooth Low Energy transport. This enables BLE devices to facilitate generic IP layer communication protocols such as Constrained Application Protocol (CoAP) over UDP/IP, Message Queuing Telemetry Transport (MQTT) over TCP/IP or HyperText Transfer Protocol (HTTP) over TCP/IP, without relying on specific Generic Attribute (GATT) profiles to be supported on the device and without having to rely on a GATT client to fetch the data from the device acting as a GATT server as it may autonomously decide to send the data whenever it has new data available (and adjust its wake up schedule accordingly). It also enables each device to have a generic addressing scheme which allow the BLE Personal Area Network to extend into a Wide Area Network.

In the area of mobile medical devices, it is of particular interest for such devices to operate at low power consumption, so as to lengthen the time the device can operate on a single device battery charge, and consequently to reduce likelihood of a device failure due to an exhaustion of the stored electrical power. While technologies such as BLE are beneficial in this regard, the goal in some mobile medical devices is operation for extended periods, e.g. a period of weeks or longer, on a single battery charge.

The following discloses certain improvements.

SUMMARY

In some illustrative embodiments disclosed herein, a wireless device comprises a radio for communicating via a wireless communication protocol which employs messages constructed as layer 2 MAC frames each including a layer 2 MAC header and a payload. The wireless device is configured to operate in (i) a first mode in which the wireless device transmits messages (NO, Nn) via the radio each including an IPv6 packet header and an upper layer protocol data unit encapsulated within the payload of a layer 2 MAC frame and (ii) a second mode in which the wireless device transmits messages (M0, . . . , Mn) via the radio each including an upper layer protocol data unit encapsulated within the payload of a layer 2 MAC frame without including the IPv6 header. The wireless device is further configured to transition from the first mode to the second mode by operations including transmitting a header information message (X) via the radio (R) to a relay device (T) which provides a header insertion service (I), the header information message including at least an address (A) of the wireless device to be used to construct an IPv6 source address or an address (D) of a host device to be used to construct an IPv6 destination address. In some embodiments, the wireless device is further configured to transition from the first mode to the second mode by operations further including receiving a message from the relay device which triggers the transition from the first mode to the second mode.

In some illustrative embodiments disclosed herein, a relay device comprises a radio for communicating via a wireless communication protocol which employs messages constructed as layer 2 MAC frames each including a layer 2 MAC header and a payload. The relay device is configured to perform a header insertion service in which the relay device receives messages (M0, . . . , Mn) via the radio from a wireless device each including an upper layer protocol data unit encapsulated within the payload of a layer 2 MAC frame without including the IPv6 header and inserts header information (A') into the messages received from the wireless device and retransmits the messages with complete headers as messages (M0', . . . , Mn'). The relay device is further configured to receive a header information message from the wireless device and store header information contained in the header information message at the relay device as header information. The relay device may be further configured to transmit a message to the wireless device to inform the wireless device of availability of the relay device to perform the header insertion service for the wireless device.

In some illustrative embodiments disclosed herein, a system comprises a wireless device and a relay device as set forth in the two immediately preceding paragraphs.

BRIEF DESCRIPTION OF THE DRAWINGS

The invention may take form in various components and arrangements of components, and in various steps and arrangements of steps. The drawings are only for purposes of illustrating the preferred embodiments and are not to be construed as limiting the invention.

DETAILED DESCRIPTION

Figure 1:
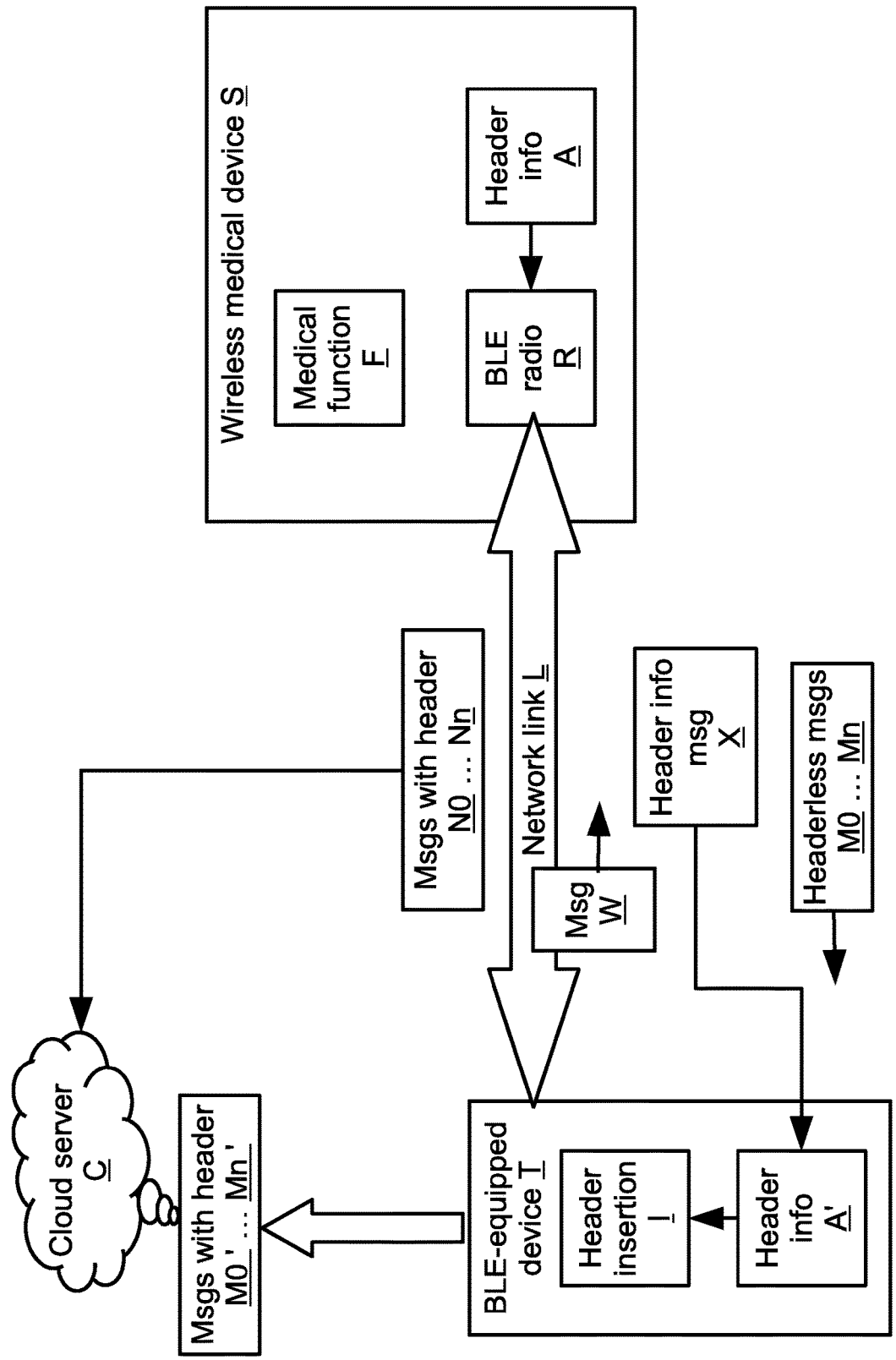
FIG. 1 diagrammatically illustrates an embodiment of a low power wireless medical device operating in conjunction with a header insertion device to reduce power consumption of the wireless medical device.

An IPv6 address is 128 bits long. Since the header of every IPv6 frame includes a source address and a destination address, together with some other header attributes such as payload length, version and hop limit, each header is minimally 40 bytes long. If in addition the UDP or TCP transport protocol headers need to be included as well this would mean an additional 8 respectively 20 bytes extra. This would result in a major overhead in the payload of a BLE packet data unit (PDU), especially in case of BLE sensor devices for which the data payload is usually quite small (e.g. temperature reading in Celsius/Fahrenheit, heartrate in beats per minute). Therefore RFC7668 requires that all headers must be compressed according to the encoding formats described in the RFC6282 document. A border router (or other suitable device such as a smartphone, tablet, or bedside monitor) expands the compressed headers into full headers before forwarding the frame to its destination. This is known as the IP Header Compression (IPHC) format, and may reduce the IPv6 header size significantly. An IPv6 address consists of a 64 bit network address (prefix) and a 64 bit interface address (IID). Typically, the IPv6 address space is globally divided into (in order): a registry, an ISP prefix, a site prefix, a subnet prefix, and an interface ID. Typically, a single subnet has sufficient address space to cover a large number of devices (e.g. $2^{64}$), and should be sufficient to cover any large company or organization and assign any device with a unique global address, with room to grow. A large hospital can easily be covered by a single subnet, but may wish to deploy two or more subnets, e.g. one for the internal clinical device network, and one to provide internet access to guests and/or patients.

In addition to a global address, every device also has a link local address, that can be used for one hop communication (e.g. in a small network). For IPv6 header compression a distinction is made between the global address and the link local addresses. If IPv6 link local addresses can be used for source and destination and the local interface addresses can be derived from the device addresses (i.e. a stateless address configuration), then the compressed IPv6 header size may be reduced to just 2 bytes. If the source and destination address belong to the same IPv6 subnet and the prefix of this subnet is available from a context table, the prefixes may be elided and the header size may be reduced from 40 to 19 bytes (or less if the IIDs can also be compressed, for example if the source or destination address is a link-local address). For non-link-local IPv6 addresses, Neighbor Discovery (ND) is required and a context table or routing table must be maintained. These context tables may be different for source address prefixes and destination addresses prefixes.

If User Datagram Protocol (UDP) is used as a transport protocol for the application, the UDP header may also be compressed from 8 bytes to a minimum of 2 bytes. In some examples of IPHC compressed headers for UDP over IPv6, the IPHC compressed header is 6 bytes, 8 bytes, or 13 bytes.

A device typically has a global address assigned by the network using Dynamic Host Configuration Protocol, e.g. DHCPv6. However, if a device is mobile, the device may need to switch to another subnet or site, or perhaps even another Internet Service Provider (ISP), for example the mobile device may switch from BLE radio within the hospital to a cellular network if the mobile device leaves the hospital. In such cases, the IPv6 source address to be used in communication may change with the change in subnet, site, or ISP. In order to facilitate mobility of IPv6 devices, several standards have been created, such as Mobile IP v6, Proxy Mobile IPv6, and Hierarchical Mobile IPv6 (HMIPv6) Mobility Management. Also, technologies such as NPTv6 may be of assistance here to provide stateless translation of the network prefix portion of the IPv6 address to another e.g. global network prefix. Two prefix translators within two networks could be configured identically, or traffic from two networks may come together in an encompassing edge router and perform NPTv6 or NAT64 translation, resulting in the same IP address for the outside world. NPTv6 is seen as the successor of NAT44 (Network Address Translation from IPv4 to IPv4), which translates IP addresses from one IPv4 address space to another IPv4 address space and was primarily needed because of the limited IPv4 address space. For IPv6, the idea is that Network Address Translation as such would typically not be needed anymore due to vast address space, although for the time being it may be used for translating IPv6 to IPv4 and vice versa.

Supporting mobility is important in mobile medical devices. For example, in case of a BLE healthcare sensor, in a typical scenario the sensor may first connect to a bedside monitor, but when the patient is moved or roams the hospital the sensor may switch connection from the bedside monitor to a BLE access point (AP) across the hall, and perhaps several others along the way. The same sensor may also be used when the patient leaves the hospital—in this case it may connect to a BLE home gateway when the patient arrives at home. All these devices to which the BLE healthcare sensor may connect during its lifetime may provide different features in terms of support for advanced routing features and in terms of trust (e.g. may be from same manufacturer or from competing manufacturers, etc.). In particular in case of Bluetooth and some other wireless protocols, the devices to which it connects may not always be trusted.

In the RFC7668 document and in "Internet Gateways", Bluetooth White Paper, 2017, a BLE gateway with Bluetooth IP-native 6LoBTLE nodes is described. Although IPv6 provides a generic addressing mechanism for any device anywhere and IPHC header compression formats have been standardized in the cited documents, these methods lead to unnecessary power consumption. This is because with all methods as described above (IPv6 header compression, Mobile IPv6 (normal and hierarchical), Proxy Mobile IPv6) the IP stack is expected to be active on the 6LoBTLE node, and because of the transmission power required for sending the compressed IPv6 header as discussed below. This is partially based on the assumption that a device may want to have generic IP support to be able to reach various destinations (e.g. mobile phone being used to browse the web). However, this may not be the case with e.g. a sensor device that only sends its data to a pre-determined destination server.

Furthermore, the IPv6 header, even with source and destination address compressed, still introduces substantial message overhead, especially in the case of messages with small payloads. For example, if a BLE sensor device wants to send its sensor data to routable address (outside the link-local one hop scope), e.g. a centralized sensor aggregation device or to a cloud server on the internet, the IPv6 header would be at least 10 bytes long (in order: 1 byte for the dispatch header field, 2 bytes for the IPHC header field, 1 byte for the context ID header field, 2 bytes for the Dst Comp IID header field, 1 byte for the NHC UDP header field, 1 byte for the UDP ports header field, and 2 bytes for the Checksum header field) provided that the border router has the prefix of the destination address registered in its context tables. For low energy operation it would be beneficial if this overhead could be further reduced.

In the case of two-way communication, the global source address may need to be used instead of the link-local address, leading to at least 2 additional bytes. In the case of Mobile IPv6 (standard and hierarchical Mobile IP), the BLE sensor device would even need to do IPv6 packet encapsulation at the sensor device itself, whereby the sensor device needs to be aware of its care-of-address, the address of the Home Agent (HA) or Mobility Anchor Point (MAP) to be able to encapsulate the packet. This leads to multiple IPv6 addresses being included in each packet, leading to larger packets and hence additional overhead on top of non-mobile IPv6 solutions.

In embodiments disclosed herein, a BLE device is enabled to use IPv6 and upper layer protocols such as CoAP for its communication, including end-to-end encryption of the payload, while reducing the communication overhead and reducing the overhead of IP packet handling and compression, and hence power consumption. This is done by omitting the transmission of IPv6 headers and UDP/TCP headers when not necessary after the BLE device dynamically discovers that another BLE device (e.g. a BLE access point or gateway) can perform IPv6 header insertion on behalf of the BLE device. By doing this dynamically, the disclosed approaches support mobility and allow roaming from one access point to another, inside or outside of the local network, while applying the proposed power optimizations whenever appropriate.

End-to-end encryption and/or mutual authentication is important for communication of medical data. In end-to-end encryption, a password, passcode, or other secret is shared between the BLE sensor and the destination server, and the secret is used to derive keys to encrypt the data. In mutual authentication, the knowledge of a shared secret between the BLE sensor and the destination server that is used to derive the keys to encrypt the data is verified. However, in BLE the implemented security between devices may be lacking e.g. when "Just-works" pairing is used. This is a problem in medical contexts because, in a healthcare environment, patient medical data should not fall in the wrong hands and should be delivered in a reliable manner to the appropriate destination (e.g. a hospital server computer hosting an Electronic Medical or Health Record, a nurses' station computer, and/or so forth). To provide a sufficient level of security, the entire network path from the sensor to the server should be considered secure (e.g. using IPSec Authentication Headers in communication to/from the server to make sure the IP layer fields have not been tampered with, or other mechanism to verify that the intermediate nodes can be trusted e.g. by proving knowledge of a shared secret). Preferably, the sensor can verify using end-to-end encrypted acknowledgements if the data is received correctly (e.g. using an encrypted COAP acknowledgement or HTTP 200 OK message); in this way, the sensor can safely send its data to the server or otherwise break the connection. For BLE actuator devices that deliver medical therapy to a patient, secure communication between the actuator device and the server device controlling the actuator device must be trusted in order to ensure patient safety.

Embodiments disclosed herein provide additional mechanisms to reduce the power consumption of BLE-equipped medical devices (e.g. vital sign sensor devices, actuator devices, or so forth) by letting the BLE access point/gateway filter out end-to-end encrypted messages without the need to decrypt them, which results in reduced volume of communication between the BLE sensor/actuator and the BLE access point/gateway and allows increased sleeping times between listen intervals and hence reduces power consumption, while keeping the communication secure and reliable. These benefits are achieved while also supporting roaming, as the BLE device can flexibly connect to different devices along the way, e.g. another BLE access point in the hospital, or mobile phone, or bedside monitor, or home gateway when the patient arrives at home wearing the same sensor.

Figure 2:
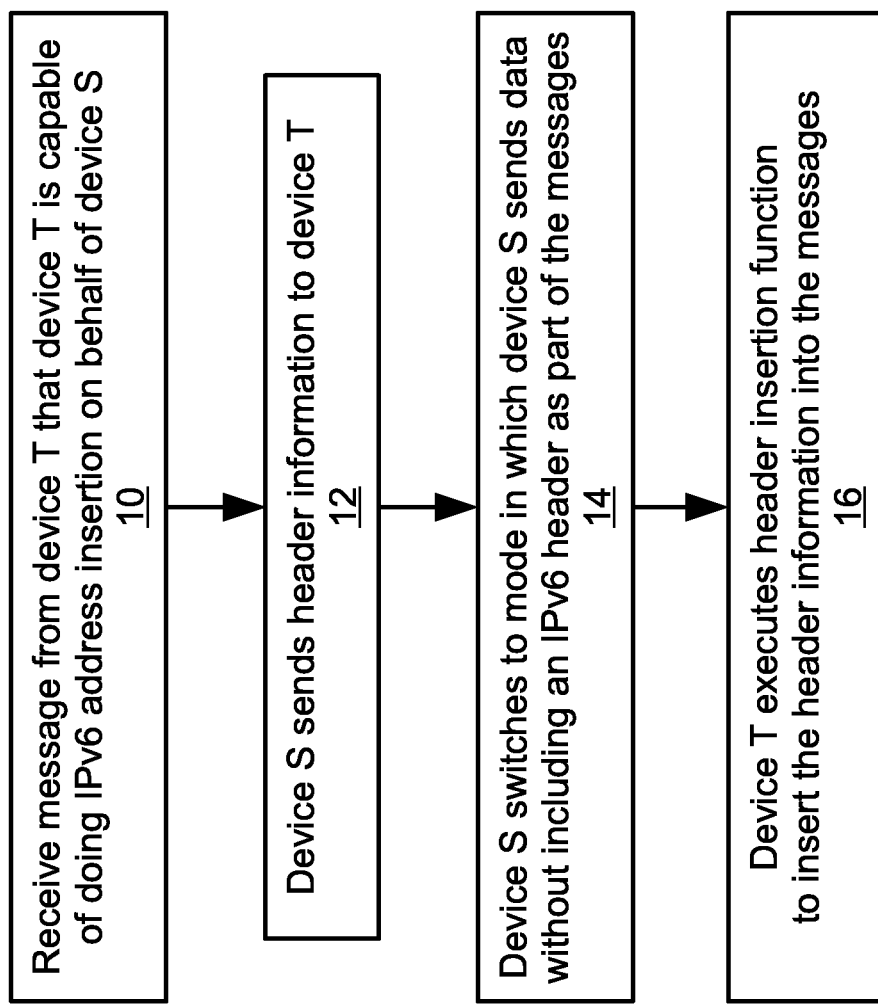
FIGS. 2-7 diagrammatically flowchart communication methods described herein.

With reference to FIGS. 1 and 2, an illustrative embodiment includes a wireless medical device S (e.g. medical sensor or actuator) equipped to perform a medical function F. The device S is equipped with storage to store an IPv6 address and/or other header information A that uniquely identifies device S in a wireless communication network (e.g. a Bluetooth network), and whereby device S is further equipped with a Bluetooth Low Energy (BLE) radio R which is used to form a communication link L with a device T. As shown in FIG. 2, upon receiving 10 a message W from device T over the communication link L that device T is capable of doing IPv6 header insertion on behalf of the wireless medical device S, the device S sends 12 header information A to the device T using a header information message X, and the device S switches to a mode 14 in which the device S sends its data over the BLE communication link L by including the data as part of messages M0 . . . Mn which do not include an IPv6 header as part of these messages (though they may include other header information such as PHY/MAC headers). The device T receives the header information message X and stores a copy of the received header information A' of the device S; thereafter, upon receiving messages M0 . . . Mn the device T executes 16 a header insertion function I to insert the header information A' into the messages M0 . . . Mn to complete the headers and create corresponding valid IPv6 messages with the (copy of) received header information A' inserted in the IPv6 message header of these messages, and retransmits the messages with inserted header information via BLE as messages M0' . . . Mn' each with valid IPv6 header. Message X may include a source IPv6 address (or portion thereof) and/or a destination IPv6 address (or portion thereof) and/or values for the Traffic Class and/or extension headers that can be used by device T to construct a valid IPv6 header of messages M0' . . . Mn'. Other fields in the IPv6 header to be constructed by device T for messages M0' . . . Mn', such as the payload length, can be derived from the payload length indicated in a layer 2 header within messages M0 . . . Mn. Others such as version and hop limit fields can be filled with default values, i.e. value 6 for version and value 255 for hop limit.

Figure 3:
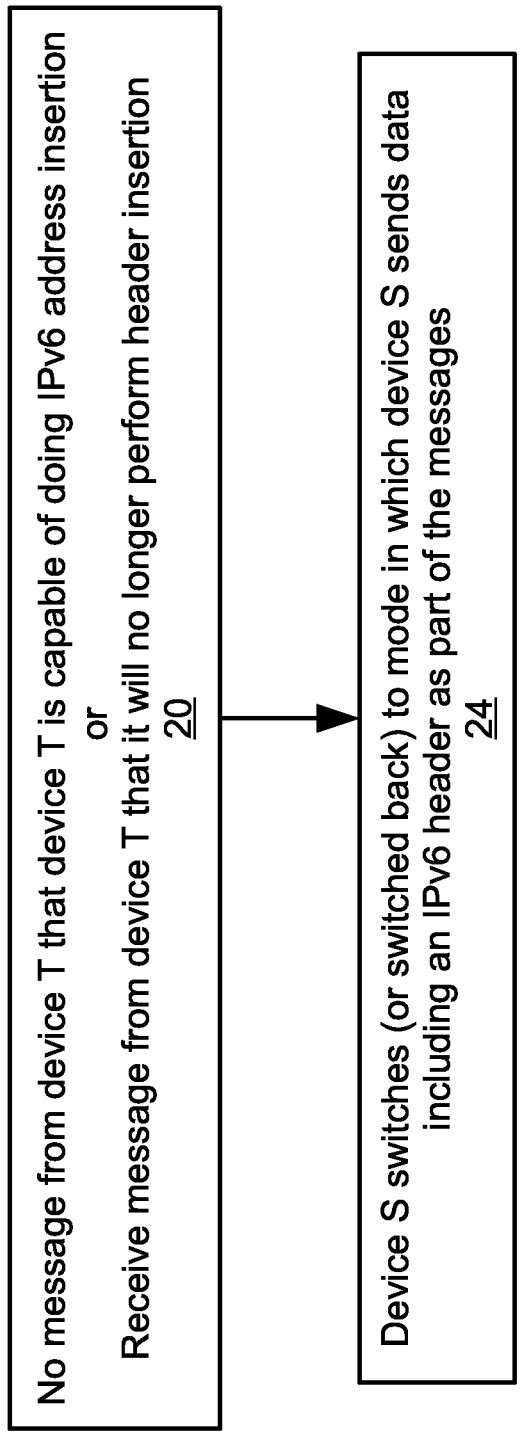

Conversely, as shown in FIG. 3, upon not receiving a message from device T over the communication link that device T is capable of doing header insertion on behalf of device S (or upon receiving a message from device T indicating it will no longer perform the header information insertion service I) 20, wireless medical device S switches to (or switches back to) a mode 24 whereby it sends its data as IPv6 messages N1 . . . Nn over the BLE communication link which do include full headers or a header-compressed IPv6 header.

Thus, it is seen that the device T may be referred to as a relay device T, or as a header insertion device T, or similar nomenclature. It will be appreciated that device T is preferably a device for which power consumption is less critical as compared with the wireless medical device S. The power-consuming process of adding and transmitting the header is no longer performed by the wireless medical device S which is desired to be a low power consumption device, and instead is performed by the header-insertion device T which does not need to be as low in power consumption. To this end, it only needs to send one time a message X containing header information such as source IPv6 or destination IPv6 address to be used by relay device T, in order to initiate the transition to this low power operation mode in which device S does not need to send IPv6 header information anymore.

The wireless medical device S includes components (not shown) such as a microprocessor, microcontroller, Field Programmable Gate Array (FPGA), graphical processing unit (GPU), or other programmable electronic chip (optionally multi-core, including a math coprocessor, or otherwise enhanced) and a non-transitory storage medium storing instructions readable and executable by the programmable electronic chip to perform functionality pertaining to implementing the medical function F and to implement wireless communication in conjunction with the BLE radio R as disclosed herein. The non-transitory storage medium may comprise (by way of non-limiting illustrative example) a FLASH memory, read only memory (ROM), electronically erasable programmable ROM (EEPROM), or variants thereof, and/or a magnetic storage medium (e.g. hard disk), optical storage medium (e.g. optical disk), various combinations thereof, and/or so forth. The medical function F performed by the mobile medical device S depends upon the type of device, and the device S may include additional components as appropriate for performing the medical resource or function F. For example in the case of the medical device S comprising an infusion pump the device S includes suitable pump hardware and flow sensors and/or so forth, and the medical resource or function F may include functions such as controlling intravenous (IV) fluid flow, measuring IV fluid flow, measuring temperature of IV fluid, and/or so forth, and the programmable electronic chip is programmed to implement the medical resource or function F including operating the pump based on flow feedback from the flow meter to deliver a controlled flow of IV fluid and optionally to perform other related functions such as monitoring IV fluid temperature or so forth. As another example, in the case of the wireless medical device S comprising a vital sign sensor the device S suitably further includes sensor hardware (e.g. EGC, EEG, or HR monitor electrode, a blood pressure cuff and inflation pump hardware, et cetera) and the programmable electronic chip is programmed to implement the medical resource or function F including operating the sensor hardware to acquire vital sign data. These are merely non-limiting illustrative examples, and more generally the wireless medical device S may be otherwise configured to provide desired medical function(s) F. Moreover, it is contemplated for the device S to be a device for performing a non-medical task in the context of non-medical applications.

Device T includes components (not shown) such as a BLE radio analogous to the radio R of device S, and a microprocessor, microcontroller, FPGA, GPU, or other programmable electronic chip (optionally multi-core, including a math coprocessor, or otherwise enhanced), and a non-transitory storage medium storing instructions readable and executable by the programmable electronic chip of the device T to perform the header insertion service I as well as any other functionality the device T ordinarily performs. For example, the device T may be a wireless access point (AP) and hence may include programming for that purpose, or may be a cellular telephone, tablet computer or other mobile device with a general-purpose operating system (e.g. Android or iOS operating system) and various application programs ("apps") loaded onto the mobile device, and/or so forth. The non-transitory storage medium of the device T again may comprise (by way of non-limiting illustrative example) a FLASH memory, read only memory (ROM), electronically erasable programmable ROM (EEPROM), or variants thereof, and/or a magnetic storage medium (e.g. hard disk), optical storage medium (e.g. optical disk), various combinations thereof, and/or so forth.

The server C may be a single server computer, an operatively interconnected cluster of server computers, a cloud computing resource in which computers are interconnected in an ad hoc fashion, and/or so forth.

In a further optional aspect, the payload Px of message Mx ($0 \leq x \leq n$) is encrypted by wireless medical device S and the header insertion service I performed by the device T includes the exact same payload Px as part of message Mx' without decryption/re-encryption.

In a further optional embodiment, message X includes IPv6 address and parameters related to a network transport protocol such as UDP/TCP (for example a destination port), whereby the address is a global unicast IPv6 address of a server C (optionally a cloud server), upon which device T sets up a UDP/TCP connection to server C based on the received parameters and whereby device T includes the address as destination address as part of the inserted header information A' in its IPv6 messages, and whereby device S does neither include an IPv6 header nor a UDP/TCP header as part of messages M0 . . . Mn.

Figure 4:
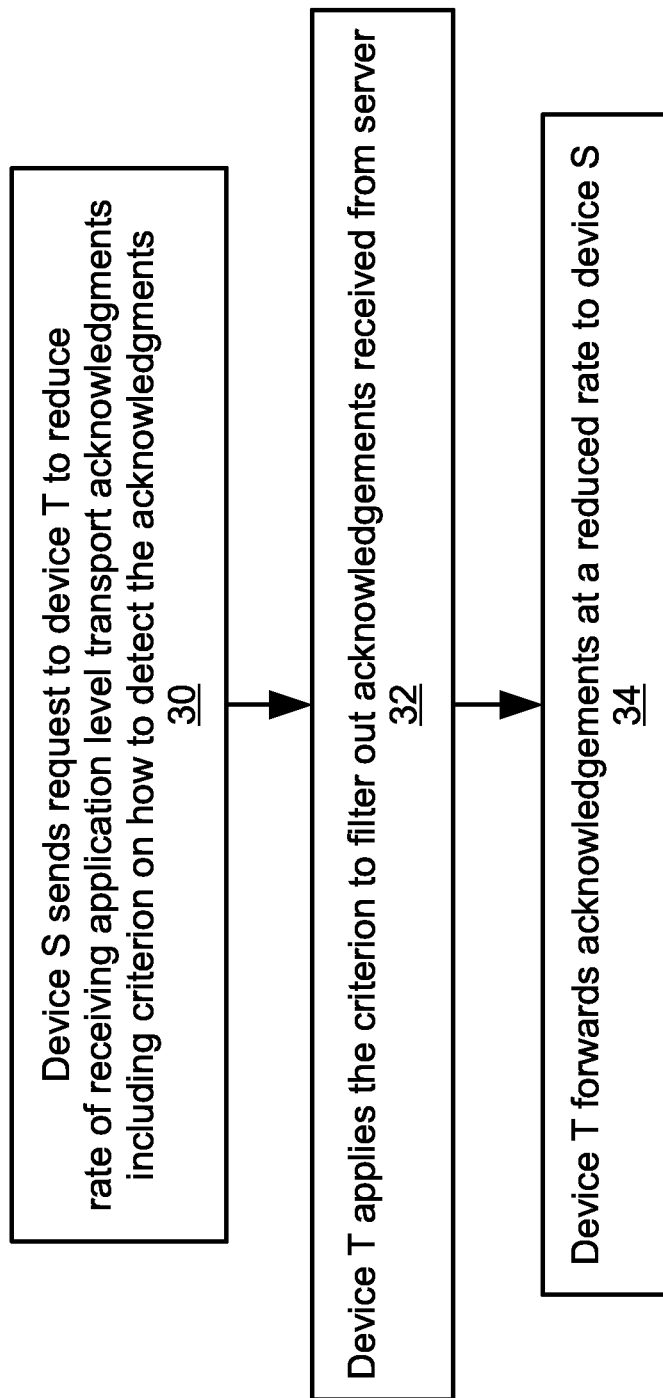

With reference to FIG. 1 and further reference to FIG. 4, in a further optional aspect (which can be performed independently of whether device T provides the header insertion service or not), device S sends a request 30 to device T using message Y (which may optionally be part of message X) to reduce the rate of receiving application level transport acknowledgements (e.g. after receiving a first correct end-to-end encrypted application level transport acknowledgement itself), whereby message Y includes a criterion on how to detect an end-to-end encrypted application level transport acknowledgement, that is, the message Y contains an acknowledgement detection criterion, e.g. typical message size, the communication protocol being used, message type or other packet header information, or in other embodiments a hash or bit pattern or CRC or keyword or regular expression or a deep-packet inspection ruleset or so forth that is indicative of an acknowledgement and/or the type of security algorithm/protocol being used for encrypting the acknowledgement (optionally extended with keys or other knowledge such as seeds, counters, homomorphic key information to partially or fully decrypt the encrypted message), after which device T applies this criterion to filter out these messages 32 received from server C, and forwards 34 these encrypted acknowledgement messages at a reduced rate to device S (e.g. by discarding half of the messages) to enable further power reduction at device S, by means of device S synchronizing its sleep/wake-up cycle with the reduced rate at which the relay device T forwards the filtered out acknowledgements to the wireless device S. In general, the application level transport acknowledgements are considered to be any type of acknowledgement for protocols above the IP layer (OSI layer 3), and hence could be TCP level acknowledgements, CoAP message acknowledgements, HTTP message acknowledgement (e.g. HTTP 200 OK success status response), application specific acknowledgements, or so forth. The acknowledgement message may be encrypted, OSCoAP, DTLS, HTTP SSL/TLS, MQTT SSL/TLS, certain IPSec options, public key encryption/Diffie Helman, AES/DES encryption, homomorphic key encryption, Deep Packet Inspection encryption, or so forth. Hence, device T may need to employ deep packet inspection techniques (e.g. based on heuristics) and e.g. employ bit-pattern or regular expression matching techniques, calculate and compare cryptographic and non-cryptographic hashes, use knowledge about the communication protocols being used and their typical communication patterns (e.g. which types of messages sent to the server would lead to acknowledgements being sent as return message), use knowledge about the security/encryption techniques being used, preferably without relay device T having knowledge about decryption keys related to decrypt the message. In addition to the criterion information received from device S, it may optionally also receive information from the server to further aid in detection and filtering of acknowledgements. Device T may set up a separate communication channel with the server to request to be informed whenever an acknowledgement was sent, and e.g. receive a message counter or header information that device T can use to identify the acknowledgement message and distinguish it from other messages. In some embodiments, the reduced rate included in the message Y is specified as a rate at which the relay device discards acknowledgements received from server that match the acknowledgement detection criterion. In some embodiments, the reduced rate included in the message Y is specified as a maximum time that the relay device discards acknowledgements received from server that match the acknowledgement detection criterion. For example, the reduced rate may be specified as a percentage, or as an integer indicative of a number of acknowledgements to discard before a next acknowledgement will be forwarded to the wireless device S, or the reduced rate may be specified as a number of acknowledgements per time unit. In general, the relay device forwards the filtered out acknowledgements to the wireless device S at the reduced rate by not forwarding discarded acknowledgements to the wireless device S.

In a further optional aspect, if the wireless medical device S does not receive an application level transport acknowledgement for a certain amount of time, the device may trigger audio/visual feedback that the device S is having issues with the connection to backend server C. Typically, if device S does not receive these acknowledgements, then either this is because the communication path with the destination is broken, or because device T is a malicious device deliberately discarding messages from medical device S. By this mechanism, a malicious device cannot simply discard messages without device S being able to detect that something is wrong.

Note however that in case of medical device S being an actuator, device S cannot be sure that messages from the server controlling it are not deliberately discarded by a malicious device T as it does not know for sure which incoming messages to expect. To address this, an actuator device preferably has an additional level of trust in the device T (e.g. by verifying if device T has knowledge of a particular pre-shared secret, or device T proving it has possession of the private key belonging to a public key, or device T has sent a public key certificate that is signed by a trusted certificate authority) before allowing device T to perform the header insertion (and optional UDP/TCP transport) service I on behalf of device S. Alternatively, the application level protocol may provide a mechanism by which device S can regularly check with the server C to determine if it has sent any messages to the device S in a given time period (whereby server C can repeat any messages it has sent to device S).

In a further optional aspect, device T measures the roundtrip time for message Mx' (0≤x≤n) to the destination address of server C, and sends this information to device S using a further message, after which device S adjust its sleep/wake-up schedule and/or the rate of sending messages M0 . . . Mn based on the received round trip time.

In a further optional aspect, device T sends the UDP/TCP port information of the ports it opened on device T to receive incoming messages from server C to device S, which stores this information. If device S connects to some device U (not shown), device S sends this UDP/TCP port information to device U, along with the source and destination IPv6 address and destination UDP/TCP port to device U, which uses this UDP/TCP port information to set up the source port for incoming UDP/TCP traffic coming from server C.

In a further optional aspect, the header information A of device S (and its copy A' at the relay device T) includes a securely hashed/encrypted sensor ID. This reduces the amount of application layer data to be sent, since the identification of the sensor can be done directly from the source address. The resulting output of securely hashing or encrypting the sensor ID can be used within the 64 bit HD part of the IPv6 address (one could use a bigger part of the IPv6 address, but this may lead to routability problems as e.g. with 128 bit ORCHID IPv6 identifiers). This approach assumes that the ecosystem of devices that are able to connect to the server works with a less or equal to 64 bit sensor ID address space.

In the embodiment of FIG. 4, power saving at the wireless device S is achieved by reducing the rate of acknowledgements that are forwarded to the wireless device S. This is done by: receiving message Y from the wireless device S wherein the message Y includes a request that acknowledgments received at the relay device T from the server be sent to the wireless device S at a reduced rate, and wherein the message Y further includes an acknowledgement detection criterion; applying the acknowledgement detection criterion to filter out acknowledgements received from the server; and forwarding the filtered out acknowledgements to the wireless device (S) via the radio at the reduced rate. More generally, it is contemplated to employ this processing to forward messages of other types at a reduced rate. For example, the disclosed approach may be used to forward response messages or server initiated messages other than acknowledgements at a reduced rate. In the generalized case, the relay device T receives message Y from the wireless device S wherein the message Y includes a request that messages of a message type received at the relay device T from the server be sent to the wireless device S at a reduced rate. The message Y further includes a detection criterion for detecting messages of the message type. The relay device T applies the detection criterion to filter out messages of the message type received from the server, and forwards the filtered out messages of the message type to the wireless device S via the radio at the reduced rate. Again, the detection criterion may be a typical message size for messages of the message type, the communication protocol being used, message type or other packet header information, a hash or bit pattern or CRC or keyword or regular expression or a deep-packet inspection ruleset or so forth that is indicative of messages of the message type, and/or the type of security algorithm/protocol being used for encrypting messages of the message type (optionally extended with keys or other knowledge such as seeds, counters, homomorphic key information to partially or fully decrypt the encrypted message), and/or so forth.

Figure 5:
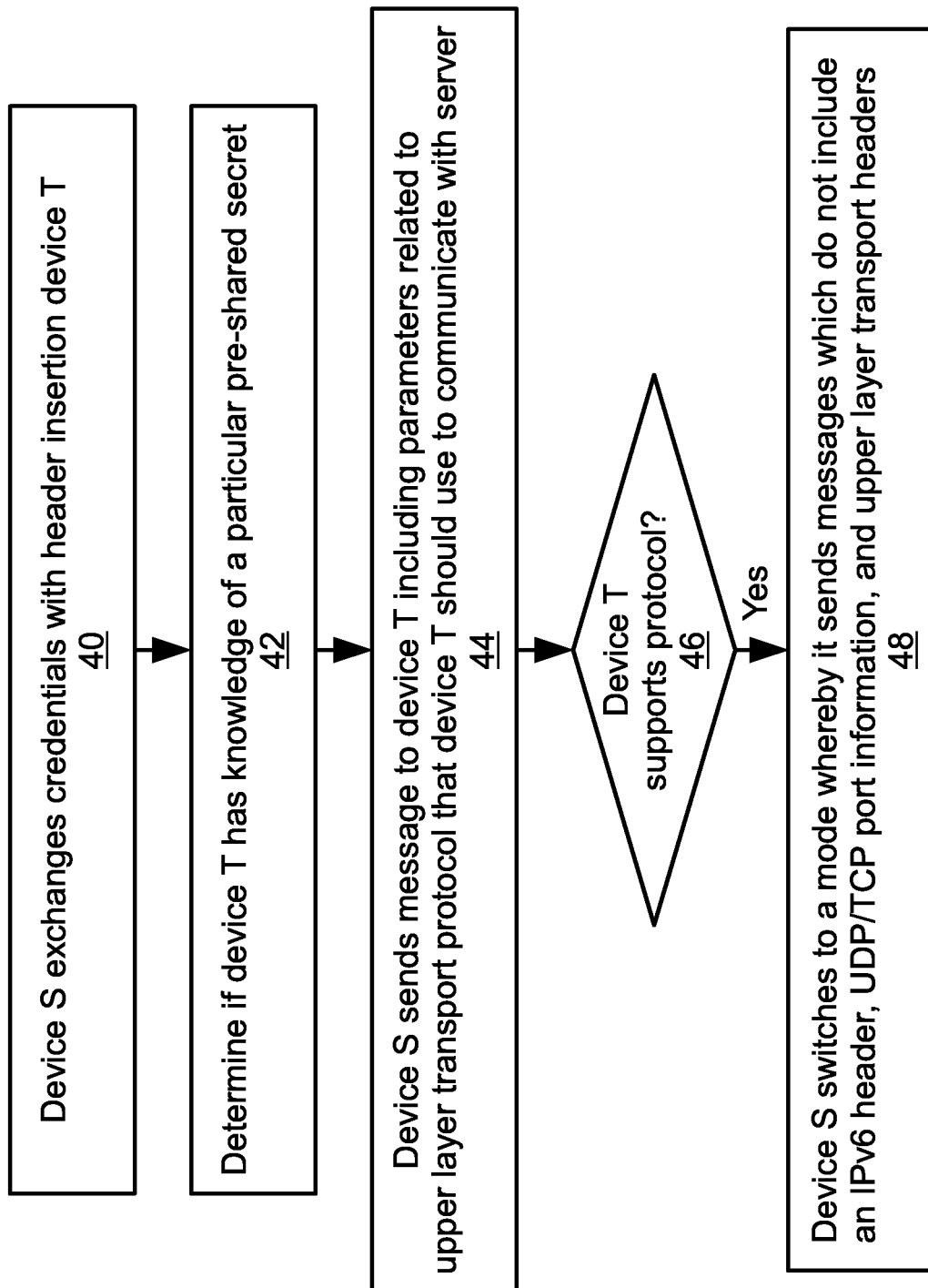

With reference to FIG. 1 and with further reference to FIG. 5, in a further optional aspect, wireless medical device S exchanges credentials 40 with device T (e.g. using Diffie-Helman exchange) to determine 42 if device T has knowledge of a particular pre-shared secret (e.g. common for devices of a certain manufacturer) and if so device S sends 44 message Z (not shown; optionally part of message X or Y) to device T which includes parameters (such as destination URI of the server resource, REST action to take e.g. GET, POST) related to an upper layer transport protocol (such as HTTP, CoAP, MQTT) that device T should use to communicate with server C, and if device T supports this upper layer transport protocol 46 then device S switches to a mode 48 whereby it sends its data within messages M1 . . . Mn over the Bluetooth Low Energy communication link which do not include an IPv6 header, UDP/TCP port information, and upper layer transport headers (such as HTTP, CoAP, MQTT headers) to enable further power reduction at device S.

In a further optional aspect, device T select a transport protocol dynamically based on which protocols are declared to be supported by server C.

In a further optional aspect, device S receives messages from device T indicating errors from the upper layer transport protocol. The device may use this information for audio/visual feedback that the device S is having issues with the connection to backend server C.

Figure 6:
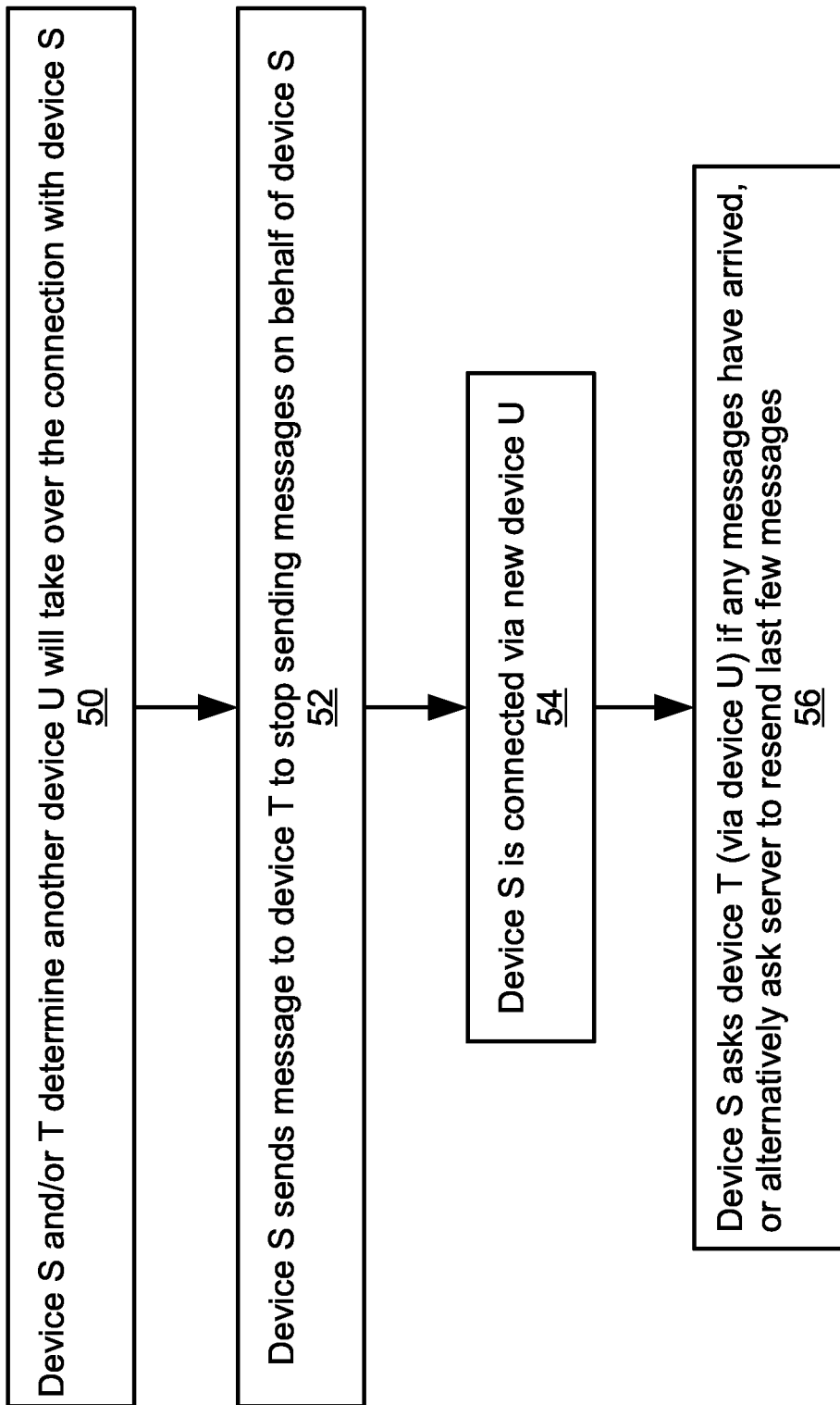

With reference to FIG. 1 and with further reference to FIG. 6, in a further optional aspect, device S and/or device T determine 50 that the quality of the link between the two devices is deteriorating (e.g. based on measuring RSSI) or that another device U is in much closer vicinity to device S and will take over the connection with device S (that is, the device S will roam from the device T to the device U), after which device S sends a message 52 to device T to stop sending messages on behalf of device S, in order to avoid any confusion if any remaining messages (e.g. retry messages or incoming messages from server C) would still be actively handled by device T whilst device S may already be connected via device U to server C. When device S is connected 54 via a new device U (that is, device S has roamed to new device U), it will ask device T (via device U) if in the meantime any messages have arrived, or alternatively ask server C to resend the last few messages 56.

Figure 7:
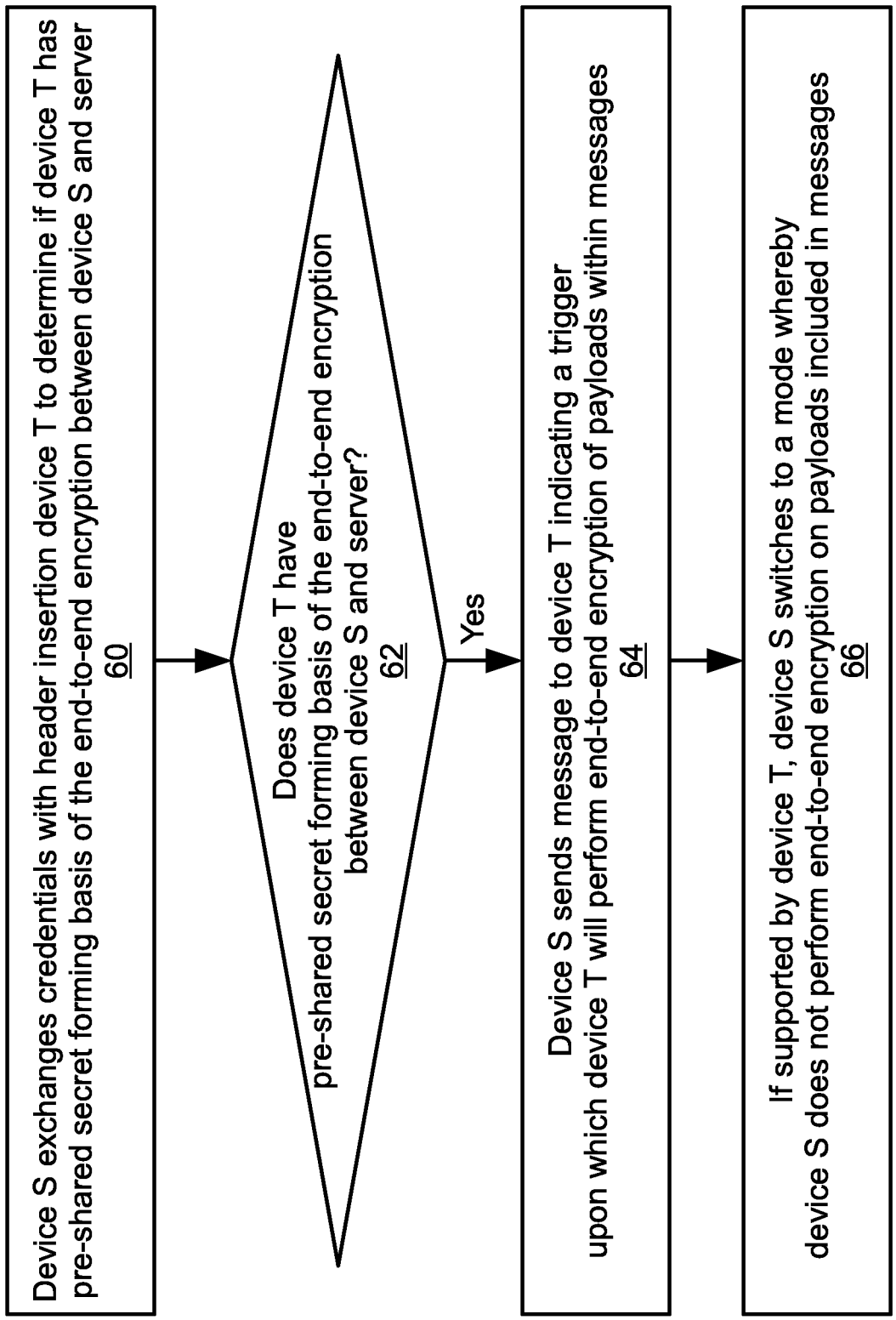

With reference to FIG. 1 and with further reference to FIG. 7, in a further optional aspect, wireless medical device S exchanges credentials 60 with device T (e.g. using Diffie-Helman exchange) to determine 62 if device T has knowledge of the pre-shared secret that forms the basis of the end-to-end encryption between device S and server C (e.g. if S, T and C fall in the same security domain as authorized by the same manufacturer or certification authority) and if so device S sends message Q (or part of message X, Y, Z) to device T which indicates 64 a trigger upon which device T will perform end-to-end encryption of the payload Px within message Mx' ($0 \le x \le n$), and if supported by device T, device S switches 66 to a mode whereby device S does not perform end-to-end encryption on payload Px includes in message Mx ($0 \le x \le n$).

Figure 8:
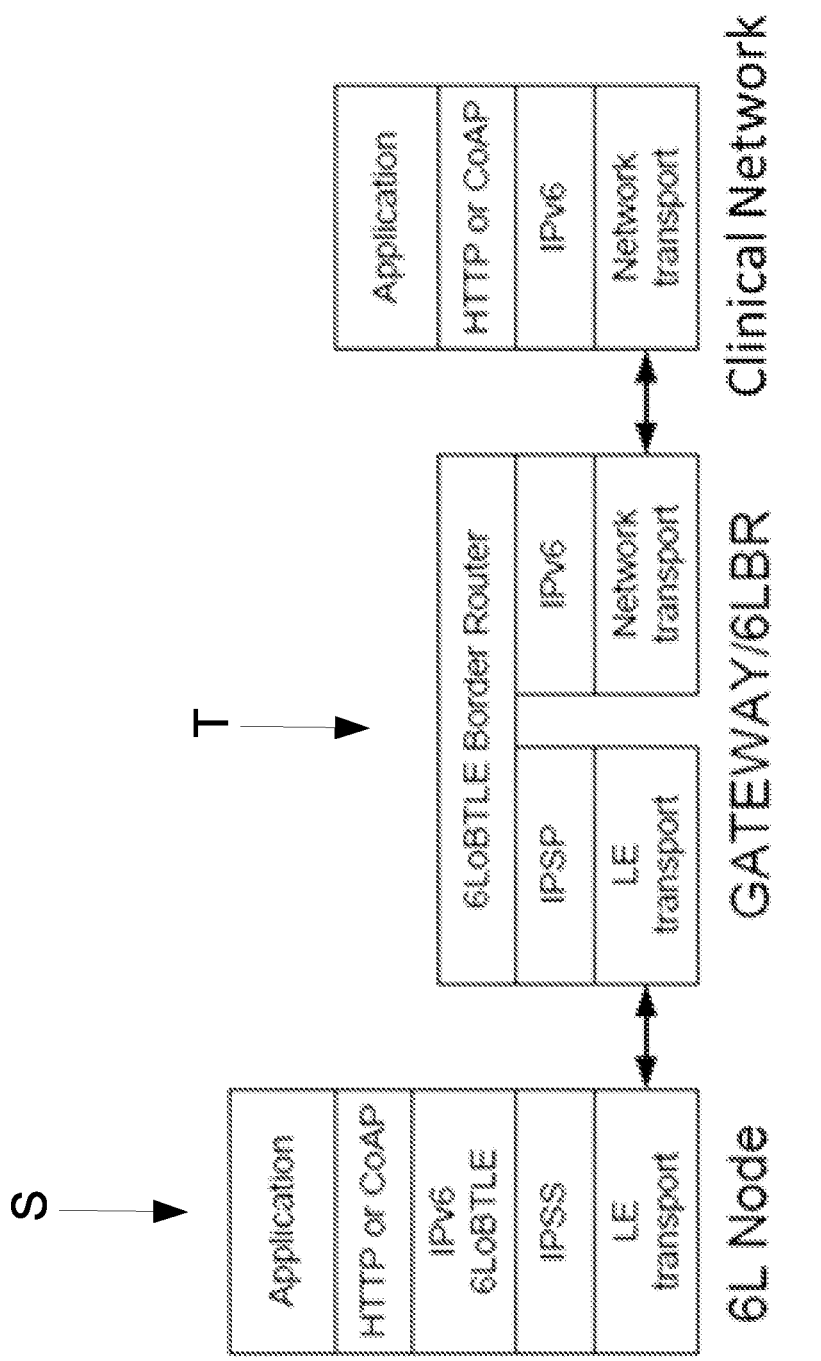
FIG. 8 diagrammatically illustrates an embodiment of a low power wireless medical device operating in conjunction with a header insertion device to reduce power consumption of the wireless medical device, in which the medical device is equipped with equipped with a BLE radio and functionality to operate as a GAP peripheral with support for IPSS, and the header insertion device is a gateway device equipped with a BLE radio and functionality to operate as a GAP central with support for IPSP.

With reference to FIG. 8, in a specific illustrative embodiment, wireless medical device S is equipped with equipped with a BLE radio and functionality to operate as a GAP peripheral with support for the IP Support Service (IPSS). Device S further equipped with functionality to operate as a 6LowPAN for BLE (6LoBTLE) Node. Device T is a gateway device equipped with a BLE radio and functionality to operate as a GAP central with support for the IP Support Profile (IPSP). Device T is further equipped with functionality to operate as a 6LowPAN for BLE (6LoBTLE) Border Router. Medical device S is typically very power constrained and may run on coin-cell batteries, whereas the relay device T is typically a mains-powered device (although another type of device such as a cellphone or tablet computer is also contemplated). This architecture has some benefits over classical GATT based architecture, since the 6LowPAN for BLE architecture typically enables long sleep periods at the BLE sensor device, as it allows sensor to only wake up its radio if it has new data to be sent.

In order to establish a connection between device S and device T, the GAP peripheral functionality on device S is used to advertise its presence to nearby BLE devices. The GAP central function on device T detects these advertisement packets and initiates link layer connection setup between the two BLE devices by sending a CONNECT_IND PDU over the BLE radio. After the link is established, the devices perform the pairing procedure and a data communication connection is established between device S and T, whereby both devices operate a BLE transport layer using the Logical Link Control and Adaptation Protocol (L2CAP) with the additional requirements for IPSP. Alternatively, these roles may also be interchanged whereby device S operates as GAP central with IPSP support and device T operates as GAP peripheral with IPSS support and sets up a L2CAP connection in a similar manner.

In illustrations presented here, the Open Systems Interconnection (OSI) model is employed, which includes the following layers: physical layer (layer 1); Data link layer (layer 2); Network layer (layer 3); Transport layer (layer 4); Session layer (Layer 5); Presentation layer (layer 6); and Application layer (layer 7). In IEEE 802 standards, the physical layer includes the Physical Layer Convergence Procedure (PLCP) sublayer, and the Physical Medium Dependent (PMD) sublayer, while the data link layer (layer 2) includes a Logical Link Control (LLC) layer and a layer 2 Medium Access Control (MAC) layer. The network layer (layer 3) is considered the IP layer, whereby each IP packet is encapsulated in a layer 2 MAC frame. In Bluetooth, the PHY layer includes the RF and Baseband components, while the layer 2 MAC includes L2CAP and Link Manager layers. BLE packet data structure includes (in order): Preamble (1 byte), Access Address (4 bytes), Protocol Data Unit (PDU) of 2-257 bytes, and CRC (3 bytes). The PDU comprises a Data Channel PDU including (in order) PDU header (2 bytes), data payload, and MIC (4 bytes), or an Advertising Channel PDU including (in order) PDU header (2 bytes), and an advertising payload. The data payload typically consists of L2 Cap packet including (in order) an L2 header (4 bytes) and an L2 payload (up to 247 bytes). In Bluetooth, the IP layer (layer 3) is typically encapsulated within the L2 payload of the L2 Cap packet. An IP packet within the IP layer may have an IPv6 packet structure including (in order): an IPv6 Header and a Payload including (in order) Extension Headers and an Upper Layer PDU. In Long-Term Evolution (LTE), including its low power variants NarrowBand Internet of Things (NB-IoT) and LTE for Machines (LTE-M), the data link layer (layer 2) includes the Packet Data Convergence Protocol (PDCP) layer, Radio Link Control (RLC) layer and the MAC layer. The IP layer (layer 3) is typically encapsulated within the payload of a User Plane PCDP Data Protocol Data Unit (PDU).

As a further illustrative embodiment employing the above-described OSI/BLE packet/IPv6 architecture, the wireless device S comprises radio R for communicating via a wireless communication protocol which employs messages constructed as layer 2 MAC frames each including a layer 2 MAC header and a payload. The wireless device is configured to operate in (i) a first mode in which the wireless device transmits messages N0, . . . , Nn via the radio R each including an IPv6 packet header and an upper layer protocol data unit encapsulated within the payload of a layer 2 MAC frame, and (ii) a second mode in which the wireless device transmits messages M0, . . . , Mn via the radio R each including an upper layer protocol data unit encapsulated within the payload of a layer 2 MAC frame without including the IPv6 header. In a suitable approach, the wireless device is configured to transition from the first mode to the second mode by operations including transmitting header information message X to relay device T which provides the header insertion service I. The header information message includes at least an address (A) of the wireless device to be used to construct an IPv6 source address or an address (D) of a host device to be used to construct an IPv6 destination address. The wireless device may be suitably configured to transition from the first mode to the second mode by operations further including receiving message W from the relay device T which triggers the transition from the first mode to the second mode. It may be noted that the message W may also contain information about the subnet or routing prefix, that can be used by device S to select a different destination server, e.g. an in-hospital server, versus a cloud-server. Given that the IP address of a destination server may change over time, device S may once in a while need to resolve the IP address of the destination server, for example by contacting a Domain Name Server (DNS) with a fully qualified domain name or use ping with NetBios name.

Relay device T comprises a radio for communicating via the wireless communication protocol which employs messages constructed as layer 2 MAC frames each including a layer 2 MAC header and a payload. The relay device T is configured to perform header insertion service I in which the relay device receives messages M0, . . . , Mn via its radio from the wireless device S, each including an upper layer protocol data unit encapsulated within the payload of a layer 2 MAC frame without including the IPv6 header. The header insertion service I inserts header information A' into the messages M0, . . . , Mn received from the wireless device S and retransmits the messages with complete headers as messages M0', . . . , Mn'. The relay device T is configured to receive header information message X from the wireless device S and store header information contained in the header information message at the relay device as header information A'. The relay device T is further configured to transmit message W to the wireless device S to inform the wireless device S of availability of the relay device T to perform the header insertion service I for the wireless device S.

A system suitably comprises the wireless device S and the relay device T as set forth in the immediately preceding two paragraphs. In such wireless device S, relay device T, or system including both devices S and T, the wireless communication protocol is suitably Bluetooth Low Energy (BLE), although other wireless communication protocols are also contemplated. The messages M0, . . . , Mn are optionally encrypted by wireless device S, and relay device T includes the exact same contents of messages M0, . . . , Mn within messages M0', . . . , Mn' without decryption/re-encryption.

To enable dynamic discovery and configuration of the IPv6 header insertion feature and/or acknowledgement reduction feature, both device S and T may need to indicate support for this feature. Indication of the capability of IPv6 header insertion and/or acknowledgement reduction feature can be sent as part of advertisement data (e.g. extra field or part of advertisement payload) in BLE advertisement messages and/or Scan Request/Responses. These messages can also be used by device S to include the IPv6 address(es) stored at device S to be used as source and/or destination by device T, and/or to include the message size, hash or bit pattern used by device T for detection of acknowledgement messages from a destination server and the rate indicator by which device T should send or not send the acknowledgements to device S. This information may also be communicated using a separate L2CAP or GATT message. Alternatively, the IPv6 neighbor discovery protocol as specified in RFC 6775 and 7668 can be leveraged, for example by using an extended neighbor solicitation message using the Address Registration Option (ARO) to transmit and register a source IP address in the gateway device, extended with an additional field/parameter to indicate to the gateway device that it should use the IP header insertion feature instead of IP header compression (in which case device S will include compressed IPv6 headers within message N0 . . . Nn) or transparent relay (in which case device S will include full IPv6 headers within messages N0 . . . Nn). These messages are then used as a trigger to switch modes in device T to insert the received IPv6 address(es) as part of the outgoing messages M0' . . . Mn' and/or to start filtering out acknowledgements. The response message received by device S as a result of sending to device T one of the above mentioned messages, can be used in device S as a trigger to switch modes in device S to not send IPv6 headers as part of messages M0 . . . Mn and/or to adapt its sleep pattern based on the rate in which device S can expect to receive an acknowledgement from a server relayed via device T.

Device S has some non-transitory storage to store one or more IPv6 addresses, such as an IPv6 source address (either coming from DHCPv6 server or locally generated based on subnet information received from device T), or an IPv6 destination address (e.g. IP address of backend server configured over NFC). Note that if device S detects that subnet of device T is different than subnet of the stored IPv6 source address, it typically renews its IPv6 source address. These IP addresses can be set or retrieved using one or more additional interface function(s) or settings to the sensor, and stored locally on the device S. The locally stored IP addresses can be used to inform or update device T that exposes device S to the IP network by doing ipv6 header insertion based on the full ipv6 address. Updating the IP addresses to or from the sensor nodes will only be required if the address context of the sensor network changes, which is expected to be a rare event and thus imposes minimal overhead.

The upper layer transport protocols may include standards such as CoAP, MQTT, HTTP, but is not restricted as such. It may also include other protocols, such as IEEE 11073-20601 directly over TCP, FTP, RTSP, XMPP, MLLP, etc. For the remainder of this document, we call the term application layer protocols for these protocols, i.e. for protocols operating above the IPv6 layer. However, for low power sensors the application layer transport protocols seem to converge to CoAP, MQTT and HTTP REST, as many data formats (e.g. FHIR/HL7 data models, OCF data models, IEEE 11073 based data models, custom JSON based data models) are being mapped for transport on these application transport protocols.

Most application layer protocols require the communication channel to support two-way communication to receive response messages/acknowledgements. Normally this is a request/response mechanism and hence covers only a short time interval. Some application protocols also allow two-way asynchronous communication, for example MQTT subscribers or CoAP observers. Similarly, using a protocol such as IEEE 11073-20601 directly over TCP requires two way communication in order to facilitate manager-initiated measurement data transmission, such as a scan request. This means that the BLE sensor would need to keep a UDP or TCP port open on the device. In the proposed solution, this is now taken care of by device T, which can receive the messages from the server on behalf of device S, buffer them and send them to device S in its next wake up schedule. This increases the power efficiency of device S, since device S can reduce the times that it listens for incoming messages. To enable this, device T keeps a UDP or TCP port open for each connected device S. Device T can distinguish the traffic for each of these UDP port by maintaining virtual NICs for each IPv6 address of each connected device S (i.e. using multi-homing software).

The IP address that the BLE sensor used to subscribe to a MQTT broker or CoAP server should not change while roaming, or at least should not change frequently, as it may interrupt a current subscription or communication session which would need to be restarted. In case of IPv6, the IP addresses rarely needs to change. So in case device S roams from access point T to access point U, and after connection to access point U, device S sends its stored IPv6 source and destination address to device U, then device U can set up a UDP/TCP connection to the destination address, set up its UDP/TCP ports for receiving incoming messages. If, as according to one of the embodiment, device S has received the UDP/TCP incoming port information from device T, and passed this information along to device U, then device U can act on behalf of device S with exactly the same IP address and incoming UDP/TCP port, and start sending messages. For server C, it seems that nothing has changed, so ongoing MQTT subscriptions or COAP observer registrations will continue to operate. Device U may need to send messages to update routing tables in the network now refer to itself and not to device T anymore (e.g. by using neighbor discovery protocol). Device U may communicate with device T, or Device S itself may communicate via Device U with device T, e.g. to ask if any messages have come in for device S in the meantime. Alternatively, some application level retry mechanism to be used by device S (e.g. by asking the server to resend the last few messages). After device T discovers that device S has disconnected (for a certain amount of time, or after receiving message from device U), device T can clean up its resources for device S.

BLE actuator devices have similar issue, since they should be reachable and remain reachable for the server that controls the BLE actuator device. To ensure the device remains reachable, the actuator device may regularly send some message (e.g. keepalive message) to the server in order to keep the routing tables in the intermediate nodes on the path to the server and the IP address/port information of device S at the server up to date. Alternatively the home address to a Mobile IP home agent or mobility anchor point (MAP) could be registered in order to solve the addressability from the server. Similarly if the IPv6 address would be globally addressable, the intermediate routers or Home Agent/Mobile Anchor Point need to be made aware of new route after it connects to another access point. Registering the home address after roaming from access point T to access point U can be done by the access point U on behalf of the BLE actuator.

After finding that device T supports the requested capability and device S has done the mode switch, device S sends messages M0 . . . M1 directly over L2CAP connection whereby it secures the application level transport using application level authentication and/or end-to-end encryption achieved using e.g. OSCoAP, DTLS, HTTP SSL/TLS, MQTT SSL/TLS, certain IPSec options, public key encryption/Diffie Helman, AES/DES encryption, or so forth.

While described in the context of a low power wireless medical device employing Bluetooth Low Energy (BLE) communication of messages constructed as IPv6 packets, it will be appreciated that the disclosed approaches for operating a low power wireless medical device S in conjunction with a relay device T that provides a header insertion service I for the device S in order to reduce power consumption at device S can also be practiced in the context of other wireless communication protocols which employ messages constructed as packets each including a header and a payload, such as WiFi, narrowband Internet of Things (NB-IoT), Long-Term Evolution (LTE), LTE-M, 5G New Radio, or so forth. Moreover, the gateway device can be an access point, cellular base station, a server in cloud, a virtual network function, or so forth.

In case of NB-IoT and LTE-M as defined by the 3rd Generation Partnership Project (3GPP), a similar approach can be achieved, whereby device S is a device (also called User Equipment or UE in 3GPP terms) equipped with a LTE Category NB1/NB2 (in case of NB-IoT) or LTE Category M1/M2 (in case of LTE-M) radio. Relay device T is a preferably a device hosting the Packet Gateway (P-GW), since the P-GW typically allocates the IP addresses of connected UEs (e.g. through DHCP) and provides the interface to the Internet. Alternatively, the relay device T may be a device within a 4G Evolved Packet Core (EPC) network hosting a Serving Gateway (S-GW), Mobility Management Entity (MME), Service Capability Exposure Function (SCEF), or eNodeB. In embodiments in which the device T is functioning as a P-GW or S-GW, message X (for the IPv6 header insertion service) and/or message Y (for the acknowledgement reduction service) as sent from device S would preferably be a Packet Data Network (PDN) connectivity request message (encapsulated within an Evolved Packet System (EPS) session management message container as defined in 3GPP TS 24.301), extended with some additional fields to carry the header information (e.g. source address or destination address) to be used by device T's header insertion service and/or the message size, hash or bit pattern used by device T for detection of acknowledgement messages from a destination server and the rate indicator by which device T should send or not send the acknowledgements to device S. The PDN connectivity request message may optionally have an additional information element containing a Boolean flag to indicate that device T should initiate header insertion instead of header compression or transparent relay and/or a Boolean flag to indicate that device T should initiate acknowledgement reduction. Alternatively, in case of IPv6 header insertion, the PDN-Type information element could be set to value "Non IP" as a trigger to device T initiate header insertion (Note: whereas typically with value "Non IP" device T would allocate an address on behalf of device S or use its own address as source address, with this invention device T would use the source address it received from device S to construct the IPv6 source address field in the IPv6 header to be sent from device T to a destination server. Similarly for a destination address).

Alternatively, message X or Y could be a separate EPS Session Management (ESM) message sent from device S to device T acting as a P-GW or S-GW. In case of device T functioning as MME, message X or Y may be an EPS mobility management (EMM) (such as an Attach Request message) or any other Network Access Stratum (NAS) message, extended with some additional fields to carry the header information and/or acknowledgement filtering information/criterion to be used by device T. In case of device T functioning as eNodeB, message X may be an Radio Resource Control (RRC) message, such as an RRC Connection Request message, extended with some additional fields to carry the header information and/or acknowledgement filtering information/criterion to be used by device T.

The return message that is sent by device T to device S as a response to message X (e.g. an "Activate Default EPS Bearer Context Request" within an Attach Accept message as a response to a PDN Connectivity Request message, either reusing existing information elements within the "Activate Default EPS Bearer Context Request" such as PDN type value within the PDN Address Information Element, or an additional information element, e.g. with a boolean flag) can be used as message W triggering device S to switch modes. In case of IPv6 header insertion feature, if device S requested PDN Type "Non IP" and receives a response message that includes an ESM Cause information element with "Cause #57—PDN type IPv4v6 only allowed", then device S would not switch modes and operate by including full headers or header-compressed IPv6 headers as part of IPv6 message N1 . . . Nn. A similar value for the Cause information element could be defined in case device T cannot support the acknowledgement reduction.

In case of NB-IoT and LTE-M the IP messages (N0 . . . Nn) and non-IP messages (M0 . . . Mn) can be sent as payload of a User Plane PCDP Data Protocol Data Unit, or as payload of a ESM DATA TRANSPORT message if the transport is done via the Control Plane instead of the User Plane.

To enable dynamic discovery of the IPv6 header insertion feature and/or the acknowledgement reduction feature, both device S and T may need to indicate support for this feature. Indication of the capability of IPv6 header insertion by device S can be sent as part of the UECapabilityInformation RRC message extended with an additional indicator, non-critical extension or UE-EUTRA-Capability field, or as an additional field in an RRC Connection Request, Attach Request, PDN Connectivity Request or ESM Information Response message. Indication of the capability of IPv6 header insertion or acknowledgement reduction by relay device T can be sent as part of a System Information Block within a System Information message, by extending an existing System Information Block type with an additional field, or by defining an additional System Information Block type. Alternatively, it could be sent as part of an "Activate Default EPS Bearer Context Request" or ESM Information Request message, e.g. as an additional field within the Protocol Configuration Options or as a separate additional information element.

The invention has been described with reference to the preferred embodiments. Modifications and alterations may occur to others upon reading and understanding the preceding detailed description. It is intended that the exemplary embodiment be construed as including all such modifications and alterations insofar as they come within the scope of the appended claims or the equivalents thereof.

The invention claimed is:

1. A wireless device comprising:
    a radio,
        wherein the radio is arranged to communicate via a wireless communication protocol,
        wherein the wireless communication protocol uses messages constructed as at least one layer 2 frame,
        wherein each of the at least one layer 2 frame comprises a layer 2 header and a payload; and
    an electronic chip,
        wherein the electronic chip is arranged to configure the wireless device to operate in a first mode in which the wireless device transmits a first plurality of messages via the radio to a relay device,
        wherein each of the first plurality of messages comprise an IP packet header and an upper layer protocol data unit,
        wherein the upper layer protocol data unit is encapsulated within the payload,
        wherein the electronic chip is arranged to operate in a second mode in which the wireless device transmits a second plurality of messages via the radio to the relay device,
        wherein each of the second plurality of messages comprise an upper layer protocol data unit encapsulated within the payload; and
    wherein the electronic chip is arranged to transition from the first mode to the second mode,
    wherein the electronic chip is arranged in operate in a second mode in which the wireless device transmits a packet header information message via the radio to the relay device,
    wherein the packet header information message comprises at least an address of the wireless device,
    wherein the address is used to construct an IP source address or an address of a host device,
    wherein the address of the host device is used to construct an IP destination address.

2. The wireless device of claim 1,
    wherein the electronic chip is arranged to transition from the first mode to the second mode by receiving a message from the relay device,
    wherein the reception of the message from the relay device triggers the transition from the first mode to the second mode.

3. The wireless device of claim 1,
    wherein the electronic chip is arranged to transition from the second mode to the first mode in response to the wireless device roaming from the relay device to a second relay device,
    wherein the second relay device is different from the relay device.

4. The wireless device of claim 3, wherein upon roaming to the second relay device, asking, via the second relay device, whether the relay device has received any messages for the wireless device during the transition.

5. The wireless device of claim 3, wherein upon roaming to the second relay device, asking a server to resend messages for the wireless device via the second relay device.

6. The wireless device of claim 1,
    wherein the electronic chip is arranged to roam between relay devices,
    wherein the electronic chip is arranged to switch between the first mode and the second mode depending upon whether the relay device to which the wireless device is connected provides the packet header insertion service.

7. The wireless device of claim 1,
    wherein the electronic chip is arranged to exchange credentials with the relay device via the radio,
    wherein the electronic chip is arranged to transition from the first mode to the second mode if the wireless device determines the relay device has knowledge of a shared secret based on the exchanged credentials.

8. The wireless device of claim 1, wherein the layer 2 frame is a layer 2 MAC frame.

9. A wireless device comprising:
    a radio,
        wherein the radio is arranged to communicate via a wireless communication protocol, wherein the wireless communication protocol uses messages constructed as at least one layer 2 frame,
wherein each of the at least one layer 2 frame comprises a layer 2 header and a payload; and
wherein the radio comprises an electronic chip,
wherein the electronic chip is arranged to configure the wireless device to operate in a first mode in which the wireless device transmits a first plurality of messages via the radio to a relay device,
wherein each of the first plurality of messages comprise an IP packet header and an upper layer protocol data unit,
wherein the upper layer protocol data unit is encapsulated within the payload,
wherein the electronic chip is arranged to operate in a second mode in which the wireless device transmits a second plurality of messages via the radio to the relay device,
wherein each of the second plurality of messages comprise an upper layer protocol data unit encapsulated within the payload; and
wherein the electronic chip is arranged to transition from the first mode to the second mode,
wherein the electronic chip is arranged to operate in a second mode in which the wireless device transmits a packet header information message via the radio to the relay device,
wherein the packet header information message comprises at least an address of the wireless device,
wherein the address is used to construct an IP source address or an address of a host device,
wherein the address of the host device is used to construct an IP destination address.

10. The wireless device of claim 9,
wherein the electronic chip is arranged to transition from the first mode to the second mode by receiving a message from the relay device,
wherein the reception of the message from the relay device triggers the transition from the first mode to the second mode.

11. The wireless device of claim 9,
wherein the electronic chip is arranged to transition from the second mode to the first mode in response to the wireless device roaming from the relay device to a second relay device,
wherein the second relay device is different from the relay device.

12. The wireless device of claim 11, wherein upon roaming to the second relay device, asking, via the second relay device, whether the relay device has received any messages for the wireless device during the transition.

13. The wireless device of claim 11, wherein upon roaming to the other relay device, asking a server to resend messages for the wireless device via the other relay device.

14. The wireless device of claim 10,
wherein the electronic chip is arranged to roam between relay devices,
wherein the electronic chip is arranged to switch between the first mode and the second mode depending upon whether the relay device to which the wireless device is connected provides the packet header insertion service.

15. The wireless device of claim 9,
wherein the electronic chip is arranged to exchange credentials with the relay device via the radio,
wherein the electronic chip is arranged to transition from the first mode to the second mode if the wireless device determines the relay device has knowledge of a shared secret based on the exchanged credentials.

16. The wireless device of claim 9, wherein the layer 2 frame is a layer 2 MAC frame.

17. A relay device comprising:
a radio,
wherein the radio is arranged to communicate via a wireless communication protocol,
wherein the wireless communication protocol uses messages constructed as at least one layer 2 frame,
wherein each of the at least one layer 2 frame comprises a layer 2 header and a payload; and
an electronic chip,
wherein the electronic chip is arranged to configure the relay device to perform a packet header insertion service in which the relay device receives a plurality of messages via the radio from a wireless device,
wherein each of the plurality of messages comprise an upper layer protocol data unit encapsulated within the payload without including an IP header,
wherein the electronic chip is arranged to insert packet header information into each of the plurality of messages,
the electronic chip is arranged retransmit the plurality of messages with complete packet headers,
wherein the electronic chip is arranged to receive a packet header information message from the wireless device,
wherein the electronic chip is arranged to use a received header information,
wherein the received header information is a portion of the packet header information message.

18. The relay device of claim 17,
wherein the relay device is arranged to transmit a message to the wireless device,
wherein the transmission of the message is arranged to inform the wireless device of availability of the relay device to perform the packet header insertion service for the wireless device.

19. A relay device comprising:
a radio, wherein the radio is arranged to communicate with a wireless device via a wireless communication protocol; and
an electronic chip,
wherein the electronic chip is arranged to configure the relay device to relay a plurality of messages from a wireless device to a server,
wherein the electronic chip is arranged to relay messages from the server to the wireless device;
wherein the electronic chip is arranged receive a message from the wireless device,
wherein the message comprises a request and a detection criterion,
wherein the request indicates that messages of a message type received at the relay device from the server be sent to the wireless device at a reduced rate,
wherein the detection criterion is arranged to detect messages of the message type;
wherein the electronic chip is arranged apply the detection criterion to filter out messages of the message type received from the server,
wherein the electronic chip is arranged forward the filtered-out messages of the message type to the wireless device via the radio at the reduced rate.

20. The relay device of claim 19, wherein the detection criterion comprises a message size criterion.

21. The relay device of claim 19, wherein the detection criterion comprises a hash or bit pattern criterion.

22. The relay device of claim 19,
wherein the message type is an acknowledgement message type,
wherein the detection criterion comprises an acknowledgements detection criterion.

23. The relay device of claim 22, wherein the acknowledgements are end-to-end encrypted application-level transport acknowledgements sent by the server.

24. The relay device of claim 23,
wherein the reduced rate included in the message comprises a rate at which, or a maximum time, such that the relay device discards acknowledgements received from server that match the acknowledgement detection criterion,
wherein the relay device forwards the filtered-out acknowledgements to the wireless device at the reduced rate by not forwarding discarded acknowledgements to the wireless device.

25. The wireless device of claim 1, wherein the wireless device is arranged to exchange credentials with the relay device via a radio of the relay device and to send the first plurality of messages if the wireless device determines the relay device has knowledge of a shared secret based on the shared credentials.

26. The wireless device of claim 1, wherein the wireless device is configured to trigger an audio/visual alert of the wireless device does not receive a message of the message type from the relay device in a predetermined time.

27. The wireless device of claim 1,
wherein the wireless device synchronizes its sleep/wake-up cycle with a reduced rate,
wherein the reduced rate is a rate at which the relay device forwards filtered-out messages of a message type to the wireless device.

28. A method comprising:
operating a radio of a wireless device to communicate via a wireless communication protocol,
wherein the wireless communication protocol uses messages constructed as at least one layer 2 frame,
wherein each of the at least one layer 2 frame comprises a layer 2 header and a payload,
wherein the radio operates in a first mode in which the wireless device transmits a first plurality of messages via the radio to a relay device,
wherein each of the first plurality of messages comprises an IP packet header and an upper layer protocol data unit,
wherein the upper layer protocol data unit is encapsulated within the payload;
transmitting a packet header information message to a relay device,
wherein the relay device provides a packet header insertion service,
wherein the packet header information message comprises at least an address of the wireless device,
wherein the address is used to construct an source IP address or an address of a host device to be used to construct an IP destination address; and
after transmitting the packet header information message, transitioning the wireless device from the first mode to a second mode in which the wireless device transmits a second plurality of messages to the relay device,
wherein each of the second plurality of messages comprise an upper layer protocol data unit encapsulated within the payload.

29. The method of claim 28, further comprising:
receiving a message from the relay device at the wireless device, wherein the reception of the message from the relay device triggers the transmitting of the packet header information message and the transitioning.

30. The method of claim 28, further comprising:
roaming the wireless device between relay devices; and
switching the wireless device between the first mode and the second mode based on whether the relay device to which the wireless device is connected provides the packet header insertion service.

31. A method of operating a relay device comprising:
receiving a packet header information message from a wireless device, wherein the packet header information message comprises a packet header information;
performing a packet header insertion service,
wherein the relay device receives a plurality of messages from the wireless device, wherein the plurality of messages are constructed as layer 2 frames,
wherein each of the plurality of messages comprise a layer 2 header and a payload,
wherein each of the plurality of message comprises an upper layer protocol data unit,
wherein the upper layer protocol data unit is encapsulated within the payload;
inserting the packet header information into the plurality of messages received from the wireless device; and
retransmitting the plurality of messages to a server with complete packet headers.

32. A method of operating a relay device comprising:
relaying a plurality of messages from a wireless device to a server,
relaying the plurality of messages from the server to the wireless device;
receiving a message from the wireless device,
wherein the message comprises a request and a detection criterion,
wherein the request indicates that acknowledgments received at the relay device from the server be sent to the wireless device at a reduced rate;
applying the detection criterion to filter out acknowledgements received from the server; and
forwarding the filtered-out acknowledgements to the wireless device at the reduced rate.

33. The method of claim 32,
wherein the reduced rate included in the message comprises a rate at which, or a maximum time, such that the relay device discards acknowledgements received from server that match the acknowledgement detection criterion,
wherein the relay device forwards the filtered-out acknowledgements to the wireless device at the reduced rate by not forwarding discarded acknowledgements to the wireless device.

* * * * *